Jan. 22, 1957 G. NOVITZ 2,778,417
ANIMAL EXIT
Filed Feb. 21, 1955
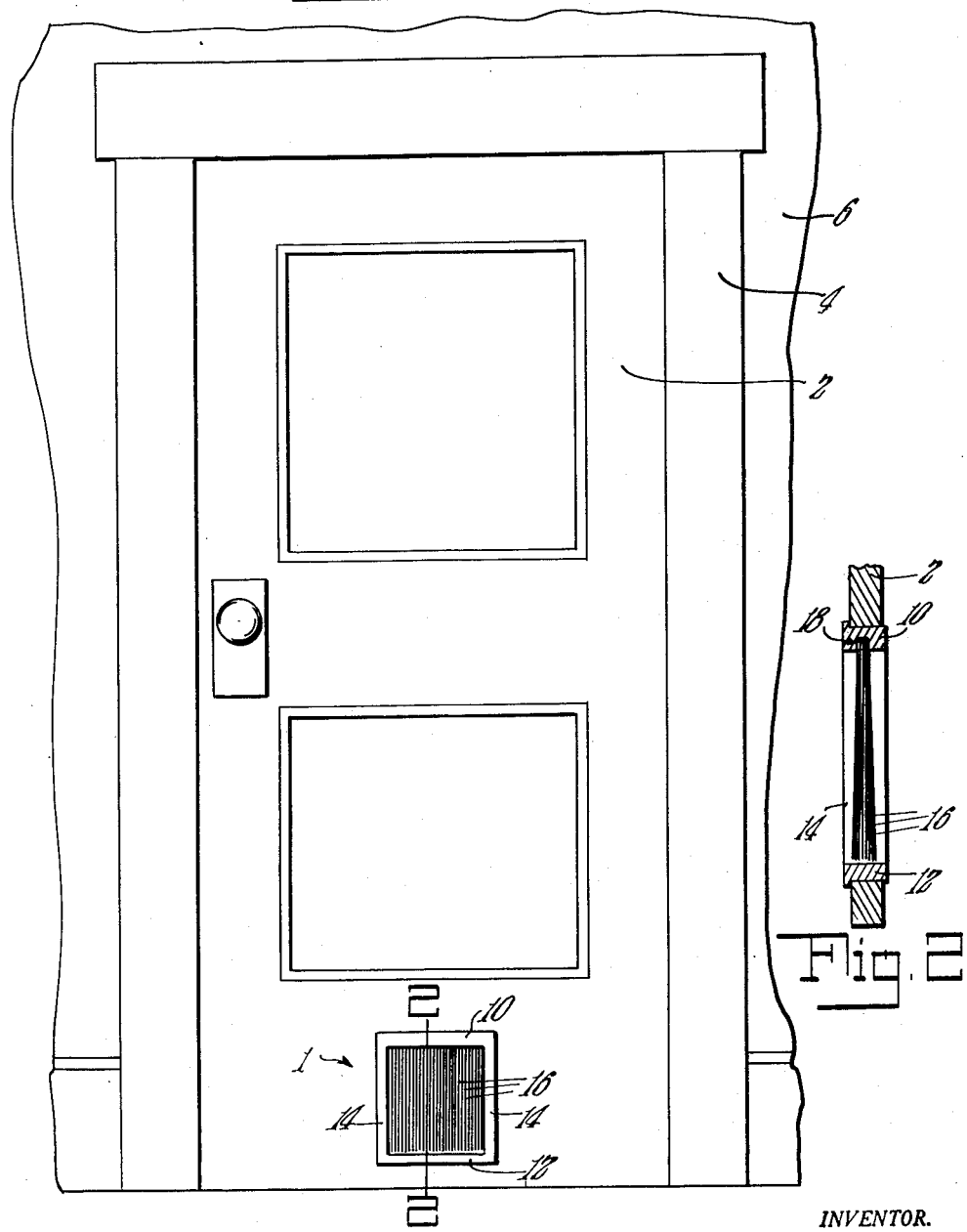
INVENTOR.
Gleason Novitz
BY
Roos & Roos
Attys & agent

2,778,417

ANIMAL EXIT

Gleason Novitz, Dalton, Mass.

Application February 21, 1955, Serial No. 489,343

1 Claim. (Cl. 160—181)

This invention relates to animal exits.

The principal object of the invention is the provision of a novel exit for the use of domesticated animals in making exit from or entrance into a building.

Exits have been provided heretofore but have usually included movable or swinging members which usually deter cats and dogs from using them.

According to the novel features of this invention novel exit means is provided which may be associated with a door, wall partition or other part of a building.

The device is of such a character as to encourage the use thereof by cats and dogs and may be of any desired dimensions to accommodate animals of different sizes.

The device of the invention is characterized by closure means, distinguished from a swingable member or the like, which consists of a multitude of elongated flexible bristle members which are easily and readily parted by an animal for passage therethrough.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is an elevational view of a door having the exit of the invention associated therewith; and Fig. 2 is a sectional elevational view on the line 2—2 of Fig. 1.

Referring now to the invention more in detail the invention will be fully described.

A door is represented by 2 and the frame or casing therefor is represented by 4 as usually arranged around an opening in a wall 6.

The device of the invention will be described in connection with the door 2 but it will be understood that it may be used in a wall, partition, window or any desired part of a building.

A frame of the device is provided which includes upper, lower and side members 10, 12 and 14 which are secured together in rigid frame forming relation.

The door 2 is provided with an opening in which the frame 1 is fitted and secured. The said frame will be located so that the lower member thereof is at a height convenient for the animal which is to make use of the device.

A multitude of elongated bristles 16 are provided which are secured at their upper ends to the frame member 10. Said bristles may be secured to the frame part 10 in various desired ways but for purpose of disclosure however, a groove 18 is shown in the member 10 in which the upper ends of the bristles are adhesively secured in the well known manner.

The bristles 16 will preferably be formed from synthetic material such as nylon or the like as distinguished from natural bristles.

Nylon bristles have been found to be suited for the practice of the invention as they maintain a straight condition and do not tend to curl and kink as do natural or vegetable bristles. The bristles are flexible and as they depend from the member 10 they are free therebelow for flexing.

A cat or dog has only to project the head through the bristles in order to part them for passage therethrough and thereafter they readily return to normal closure forming relation.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

The combination with the rectangular opening of a portion of a building having spaced upper and lower horizontal sides and opposite vertical sides of closure means for said opening comprising, a frame for securing in said opening having upper and lower members for the upper and lower sides of said opening and vertical side members for the sides of said opening, said upper member provided with an elongated groove in the lower side thereof, and a multiplicity of elongated straight bristle-like members, said bristle-like members having upper ends secured in and filling said groove of said upper member and freely depending vertically therefrom in closely adjacent intermingled relation with lower ends thereof being closely adjacent and free of the lower member, said bristle-like members being flexible for separation thereof by the passage of an animal therethrough and sufficiently stiff to assume a normal straight condition.

References Cited in the file of this patent

UNITED STATES PATENTS

| Number | Name | Date |
|---|---|---|
| 563,738 | Bunn | July 14, 1896 |
| 1,186,566 | Fogg | June 13, 1916 |
| 1,189,410 | Van Every | July 4, 1916 |
| 2,178,789 | Heath | Nov. 7, 1939 |
| 2,708,927 | Dixon et al. | May 24, 1955 |
| 2,758,646 | Johnson | Aug. 14, 1956 |